United States Patent

Hirata et al.

Patent Number: 6,106,589
Date of Patent: Aug. 22, 2000

[54] METHOD FOR TREATING NOBLE METAL COMPLEX IONS

[75] Inventors: Suehide Hirata; Koji Kusabe, both of Kawasaki; Hiroshi Nakamura, Numazu; Kikuo Fujiwara, Tokyo, all of Japan

[73] Assignees: Kawasaki Kasei Chemicals Ltd.; N.E. Chemcat Corporation, both of Tokyo, Japan

[21] Appl. No.: 08/909,882

[22] Filed: Aug. 12, 1997

[30] Foreign Application Priority Data

Aug. 26, 1996 [JP] Japan ..................................... 8-223534
Aug. 26, 1996 [JP] Japan ..................................... 8-223535

[51] Int. Cl.⁷ ..................................................... C22B 11/00
[52] U.S. Cl. .............................. 75/721; 75/711; 75/371; 75/303
[58] Field of Search ............................. 75/371, 303, 711, 75/721

[56] References Cited

U.S. PATENT DOCUMENTS

| | | | |
|---|---|---|---|
| 3,969,244 | 7/1976 | Kobayashi et al. | 210/38 B |
| 4,242,438 | 12/1980 | Sato | 430/278 |
| 4,952,514 | 8/1990 | Haddad | 436/80 |
| 5,474,593 | 12/1995 | Sakurai et al. | 75/721 |

FOREIGN PATENT DOCUMENTS 0 647 721      4/1995   European Pat. Off. .
0 647 721 A2   4/1995   European Pat. Off. .

OTHER PUBLICATIONS

*Patent Abstracts of Japan*, vol. 96, No. 8, Aug. 30, 1996, JP 8–108185, Apr. 30, 1996.
*Patent Abstracts of Japan*, vol. 95, No. 10, Nov. 30, 1995, JP 7–185568, Jul. 25, 1995.
*Patent Abstracts of Japan*, vol. 97, No. 1, Jan. 31, 1997, JP 8–238488, Sep. 17, 1996.
Hawley, G. The Condensed Chemical Dictionary, 8th Edition. Van Norstrand Reinhold: New York. pp. 424 and 802, 1971.

*Primary Examiner*—Prince Willis
*Assistant Examiner*—Tima McGuthry-Banks
*Attorney, Agent, or Firm*—Oblon, Spivak, McClelland, Maier & Neustadt, P.C.

[57] ABSTRACT

An agent for treating metal ions in an aqueous solution, which comprises an anthrahydroquinone compound and a metal supported on a carbonaceous carrier.

14 Claims, 1 Drawing Sheet

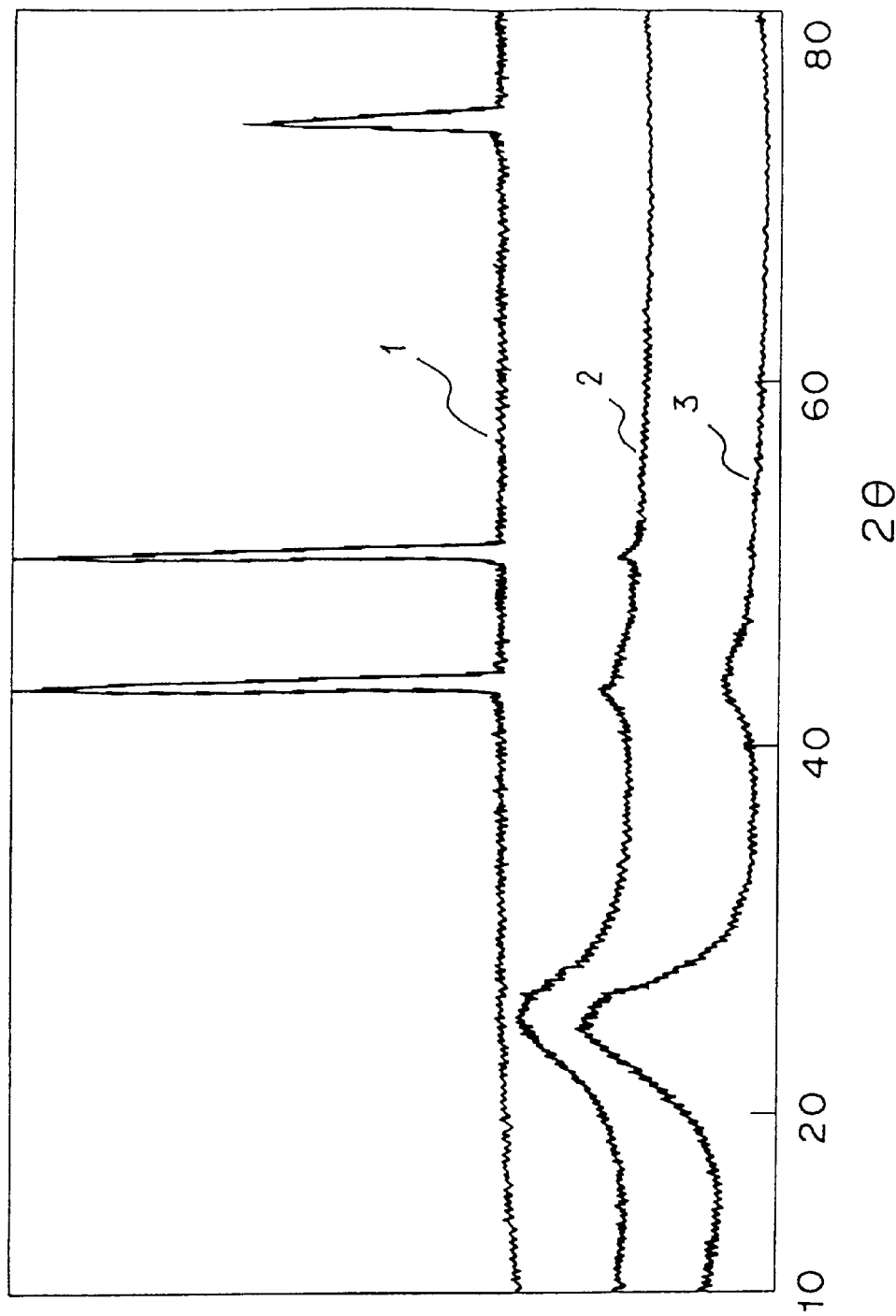

METHOD FOR TREATING NOBLE METAL COMPLEX IONS

The present invention relates to an agent for treating metal ions and a method for treating noble metal complex ions to recover noble metals which are valuable from the viewpoint of both resources and economy, from an aqueous solution containing noble metal complex ions, such as a waste water from cyan type gold plating or a waste water from palladium-nickel alloy plating.

Noble metal plating such as gold or palladium plating is excellent in the ornamental property, corrosion resistance and solderability and has a characteristic such as low electrical resistance. Accordingly, it has been widely used for ornaments, electronic parts or the like. For such plating, a plating solution containing dicyano aurate(I) complex ions, tetraammine palladium or the like is employed and to recover noble metals from waste waters discharged from various steps during plating treatment is not only economically significant but also socially important from the viewpoint of the influence to the environment.

As a method for selectively and efficiently recover metal ions, particularly noble metal ions, in an aqueous solution, a method has been proposed in which a supported product having a redox reaction reagent represented by a compound having a hydroquinone structure such as an anthrahydroquinone compound, adsorbed and fixed on a porous carrier (this supported product will hereinafter be referred to simply as a metal ion-treating agent) is packed in e.g. a column, and an aqueous solution containing noble metal ions such as gold ions (inclusive of complex ions) is passed therethrough for treatment, so that the noble metal ions are reduced and captured as zerovalent metal on said metal ion-treating agent (U.S. Pat. No. 5,474,593).

However, when the present inventors have attempted to recover a noble metal by passing a plating waste water containing noble metal complex ions such as gold cyano complex ions or palladium complex ions through the column packed with such a metal ion-treating agent, it has been impossible to sufficiently reduce and capture the noble metal complex ions, even though the redox reaction reagent in the metal ion-treating agent is present in a reducing form (an anthrahydroquinone form), whereby there has been a drawback that the noble metal complex ions flow out from the column outlet, and the recovery rate of noble metal by the metal ion-treating agent tends to be low. Accordingly, it is an object of the present invention to provide a method whereby a noble metal can be selectively and efficiently recovered from an aqueous solution containing noble metal complex ions by using this metal ion-treating agent.

To accomplish the object, the present inventors have conducted an extensive research for a method whereby the reduction reaction of noble metal complex ions will smoothly proceed on the metal ion-treating agent and as a result, have reached a concept that transfer of electrons on the metal ion-treating agent is hindered by some factors, whereby the reduction rate of the noble metal complex ions tends to be low. Accordingly, they have studied a method for improving the reduction rate, and as a result have reached an idea that the transfer rate of electrons can be improved by having a metal preliminarily supported on the metal ion-treating agent. Accordingly, an aqueous solution containing noble metal complex ions has been treated by means of a metal ion-treating agent having a metal such as copper supported on a carbonaceous carrier, whereby it has been found that the recovery rate of the noble metal can remarkably be improved. The present invention has been accomplished on the basis of this discovery.

Namely, the present invention provides an agent for treating metal ions in an aqueous solution, which comprises an anthrahydroquinone compound and a metal supported on a carbonaceous carrier, and a method for treating noble metal complex ions, which comprises reducing noble metal complex ions in an aqueous solution by means of such a metal ion-treating agent and recovering them in the form of metal.

Now, the present invention will be described in detail with reference to the preferred embodiments.

In the accompanying drawing, FIG. 1 is a powder X-ray diffraction pattern of the metal ion-treating agent of Example 2.

In the present invention, the aqueous solution to be treated may be any solution so long as it is an aqueous solution containing gold cyano complex ions or palladium complex ions. For example, it may be a plating waste water from a plating process of ornaments or electronic parts, a washing water from a washing process after plating treatment or from a stain stripping process, a waste water such as a stripping water, a recovery solution having a noble metal recovered from a waste of e.g. semiconductors or printed circuit boards by means of an aqueous cyanide solution, or an extract solution of gold obtained by treatment of a gold ore with an aqueous cyanide solution.

In the present invention, the gold cyano complex ions may, for example, be dicyano aurate(I) complex ions, tricyano aurate(I) complex ions, tetracyano aurate(I) complex ions or tetracyano aurate(III) complex ions, as shown by the following chemical formulas. In a usual waste water, dicyano aurate(I) complex ions or tetracyano aurate(III) complex ions are considered to be the main component.

Dicyano aurate(I) complex ions: $[Au(CN)_2]^-$

Tricyano aurate(I) complex ions: $[Au(CN)_3]^{2-}$

Tetracyano aurate(I) complex ions: $[Au(CN)_4]^{3-}$

Tetracyano aurate(III) complex ions: $[Au(CN)_4]^-$

In the present invention, the palladium complex ions may, for example, be tetraammine palladium complex ions, as shown by the following chemical formula:

Tetraammine palladium complex ions: $[Pd(NH_3)_4]^{2+}$

In the present invention, the anthrahydroquinone compound may, for example, be anthrahydroquinone (9,10-dihydroxyanthracene), its hydride compounds and their substitution products. The substituents in the substitution products of the anthrahydroquinone compound may, for example, be relatively hydrophobic substituents such as an alkyl group, an alkenyl group, an alkoxyl group, a phenyl group, an alkylamino group and a halogen atom. The carbon number in the alkyl group, the alkenyl group and the alkoxyl group is usually from 1 to 60, practically at most 24, and the alkyl group may be straight chain or branched.

Compounds having such sub-stituents include, for example, an alkylated anthrahydroquinone compound such as 2-methylanthrahydroquinone or 2-ethylanthrahydroquinone, and an alkenyl-substituted anthrahydroquinone compound such as 2-(4-methylpentenyl)anthrahydroquinone.

The hydride compounds of the hydroquinone compound may, for example, be 1,4-dihydro-9,10-dihydroxyanthracene and 1,2,3,4-tetrahydro-9,10-dihydroxyanthracene.

In the present invention, the carbonaceous carrier may, for example, be active carbon or active carbon fibers. Particularly preferred is active carbon, since it is inexpensive and readily available. For such a carbonaceous carrier to be preferably used, the pore size is at least 5 Å, preferably at least 10 Å, and the specific surface area is at a level of about 1000 m² per gram. Such a carbonaceous carrier may be used in any form such as a powder form, a pelletized form, a spherical form or a pulverized form.

The particle size of the pelletized form, the spherical form or the pulverized form of such a porous carrier may, for example, be from 0.3 to 2.5 mm in the case of active carbon, since the smaller the particle size, the better the contact efficiency with the aqueous solution, but the larger the flow resistance in a case where it is packed in a column and an aqueous solution containing metal ions is treated.

In the present invention, the metal to be supported on the carrier may, for example, be at least one metal selected from metals belonging to iron-group, platinum-group, copper-group, zinc-group and carbon-group. Specifically, it is preferably at least one metal selected from the group consisting of iron, cobalt, nickel, palladium, platinum, rhodium, copper, silver, gold, zinc and tin. It is particularly effective and preferred to use copper or silver for the treatment of gold cyano complex ions, and to use nickel or cobalt for the treatment of palladium complex ions.

A method for supporting such a metal on the metal ion-treating agent may, for example, be any one of a method of preliminarily supporting the metal on a carrier such as active carbon to be used for the metal ion-treating agent, a method of supporting it during the preparation of the metal ion-treating agent and a method of supporting it after preparation of the metal ion-treating agent. Usually, a method may be employed wherein a water-soluble compound of the metal to be supported is added to a medium such as water in which the metal ion-treating agent is dispersed, and in a case of a metal compound having a high oxidation reduction potential such as copper or silver, the metal compound is reduced to metal by the reducing power of the metal ion-treating agent and thereby supported, or in a case of a metal compound having a low oxidation reduction potential such as nickel or cobalt, a reducing agent is added to the medium wherein the metal ion-treating agent is dispersed, thereby to support the metal on the metal ion-treating agent.

The amount of the metal may usually be from 0.1 to 100 g, preferably from 1 to 50 g, per litter of the wet volume of the metal ion-treating agent.

Supporting of the anthrahydroquinone compound is carried out by impregnating an organic solvent having an oxide corresponding to the anthrahydroquinone compound (the anthraquinone compound) dissolved therein to a carbonaceous carrier or a carbonaceous carrier having the above metal supported thereon, then removing the organic solvent and subjecting the supported anthraquinone compound to reduction treatment with sodium dithionate (sodium hydrosulfite). Further, other than the supporting method employing an organic solvent, a method may be mentioned wherein a water-soluble salt of the anthrahydroquinone compound is adsorbed on a carbonaceous carrier or a carbonaceous carrier having the above metal supported thereon, followed by acid washing for fixing, and this method has an advantage over the above method in that no reduction treatment is required.

As an aqueous solution of this water-soluble salt of the anthrahydroquinone compound, an aqueous solution of a disodium salt of 1,4-dihydro-9,10-dihydroxyanthracene compound may, for example, be employed, which is obtainable by reacting a 1,4,4a,9a-tetrahydroanthraquinone compound obtainable by a Diels Alder reaction of naphthoquinone with the corresponding 1,3-butadiene compound, with at least an equivalent amount (at least two mols per mol of the quinone compound) of an aqueous solution of an alkali metal hydroxide.

The amount of the anthrahydroquinone compound supported on the resulting metal ion-treating agent varies depending upon the type of the anthrahydroquinone compound or the type of the solid porous carrier. However, it may, for example, be from 0.3 to 1.0 mol/l-carrier in a case where a disodium salt of 1,4-dihydro-9,10-dihydroxyanthracene and granular active carbon are used.

As a method for recovering a noble metal from an aqueous solution containing noble metal complex ions in the present invention, a batch type treating method may be employed wherein the above mentioned metal-supported metal ion-treating agent is added to the aqueous solution, followed by stirring treatment, and then the treating agent is separated by decantation or filtration. However, it is usual to employ a method wherein the above mentioned metal ion-treating agent is packed in a column (tower), and the aqueous solution is treated by passing therethrough.

The pH of the aqueous solution containing noble metal complex ions is not particularly limited so long as the noble metal complex ions are present stably in the aqueous solution. However, it is usually not desirable that the pH is higher than 12, since the anthrahydroquinone compound supported on the metal ion-treating agent is thereby likely to dissolve.

With respect to anions in the aqueous solution, anions of an inorganic acid or an organic acid may be present, so long as the target noble metal complex ions will not thereby precipitate. The concentration of the noble metal complex ions in the aqueous solution is not particularly limited so long as they are present as dissolved. However, it is usually from 1 to 50000 ppm, preferably from 1 to 5000 ppm. The treating temperature is usually from 10 to 70° C., and the treatment is usually carried out at room temperature. However, in general, the higher the temperature, the higher the recovery ability.

In the present invention, when cyano complex ions such as gold cyano complex ions, are to be treated by the metal ion-treating agent having the above metal supported thereon, it is preferred to carry out the treatment in the presence of an aldehyde which is capable of reacting with cyan compound ions freed by the reduction reaction by means of the metal ion-treating agent.

The aldehyde may be any aldehyde so long as it has a substantial water-solubility in the aqueous solution containing gold cyano complex ions. For example, in a case where the gold concentration is at a level of a few hundreds ppm, the aldehyde may be the one having a solubility of at least about a few hundreds ppm and having the effects of the present invention.

As such an aldehyde, an aliphatic aldehyde is usually preferred. Particularly preferred is a lower aliphatic aldehyde. It may, for example, be a monovalent or polyvalent aldehyde such as formaldehyde, paraformaldehyde, acetoaldehyde, propionaldehyde, butylaldehyde, crotonaldehyde or glyoxal, or a saccharide such as glucose.

The mechanism of how such an aldehyde functions in the present invention, is not clearly understood. However, it is conceivable that it may act on cyanide ions formed by reduction of gold ions by the reaction of gold cyano complex ions with the metal ion-treating agent, to form e.g. cyanhydrin, or it may catalyze the reduction reaction in the reaction of the gold cyano complex ions with the metal ion-treating agent.

The amount of such an aldehyde may usually be at least an equivalent amount (in a case of a monovalent aldehyde, at least equimolar to the total cyanide ions) so that one cyanide ion corresponds to one aldehyde group against the total cyanide ions contained in free cyanide ions and gold cyano complex ions present in the aqueous solution containing the gold cyano complex ions. If the amount is less than one equivalent, the effects tend to be correspondingly low. If the amount is too much, such is not desirable from the viewpoint of the economy or a problem of the subsequent waste water treatment. Therefore, the amount is at most 500 equivalents, practically from 1 to 100 equivalents, preferably from 1.2 to 50 equivalents.

In the present invention, instead of the above aldehyde, a metal compound which is capable of forming a cyano complex with the cyanide ions, may be used. As such a metal compound, a compound of a metal element belonging to copper-group, zinc-group or iron-group may be mentioned. For example, a compound of copper belonging to the copper-group, zinc or cadmium belonging to the zinc-group, or iron, cobalt or nickel belonging to the iron-group, may be mentioned. As a particularly effective metal compound, a compound of zinc, nickel or cobalt may be mentioned. These compounds may be used alone or in combination as a mixture of two or more of them. Namely, at least one such a metal compound may be present.

Such a metal compound may be the one which is substantially water-soluble under the treating condition of the present invention, and it may be a water-soluble inorganic salt such as a sulfate, a nitrate or a chloride of such a metal, or an organic salt such as an acetate. It may also be in the form of a complex such as an ammine complex of such a metal salt. Further, so long as it is soluble under the treating conditions, it may be in the form of a hydroxide or a zincate. However, the ligand which coordinates to metal ions when such a metal compound is dissolved in water, is limited to the one having a bonding force to the metal ions which is weaker than the cyanide ions.

At present, the mechanism of the action of such a metal compound in the method of the present invention is not clearly understood. However, it is known that such a metal compound forms a cyano complex, and it is considered that in actual treatment, it forms a cyano complex to serve effectively. Therefore, a metal compound which is in the form of a cyanide or a cyano complex is not desirable.

Specifically, such a metal compound may, for example, be a nickel salt such as nickel(II) sulfate, nickel(II) nitrate or nickel(II) chloride, a cobalt salt such as cobalt(II) sulfate, cobalt(II) nitrate or cobalt(II) chloride, or a zinc salt such as zinc(II) sulfate, zinc(II) nitrate or zinc(II) chloride. A method for incorporating such a metal compound to the aqueous solution containing gold cyano complex ions to be treated, may usually be a method wherein an aqueous solution of such a metal compound is added to the aqueous solution containing the gold cyano complex ions.

Further, if necessary, it may be added in the form of an ammine complex of a salt such as a chloride of such a metal. As such a method, a method may, for example, be mentioned in which an aqueous solution obtained by dissolving a chloride of such a metal in excess aqueous ammonia, is added. Further, depending upon the treating process or the source of the aqueous solution containing the gold cyano complex ions, such a metal compound may already be included prior to the treatment by the process of the present invention. In such a case, the present invention can be carried out as it is or after adding the metal compound partially.

The amount of such a metal compound may be at least one equivalent (for example, in the case of nickel or cobalt, ¼ mol time of the total cyano groups) corresponding to formation of its cyano complex compound or complex ions, against total cyano groups contained in free cyanide ions and gold cyano complex ions present in the aqueous solution containing the gold cyano complex ions. If the amount is less than 1 equivalent, the effects tend to be correspondingly low. If it is too much, such is undesirable from the viewpoint of the economy and the problem of the subsequent waste water treatment. Therefore, it is at most 200 equivalents, practically from 1 to 50 equivalents, preferably from 1.2 to 20 equivalents.

In the treatment of gold cyano complex ions or palladium complex ions by the metal ion-treating agent of the present invention, the complex ions are reduced to metal on the treating agent and thereby selectively captured, so that they will not be substantially detected in the treated water. The treating agent having the noble metal captured thereon was analyzed by powder X-ray refraction method, whereby it was confirmed that the noble metal complex ions were captured in the form of metal.

The mechanism in which the noble metal complex ions are captured in the form of metal on the metal ion-treating agent having the metal supported thereon, has not been clearly understood. However, as assumed from the phenomenal aspect, it is considered that when the noble metal complex ions are in contact with the treating agent, the complex ions are reduced by the anthraquinone compound by means of the metal supported on the treating agent, whereby the noble metal will be laminated and will grow to form a noble metal coating film on the treating agent.

Now, the present invention will be described in further detail with reference to Examples. However, it should be understood that the present invention is by no means restricted to such specific Examples. In the Examples, "%" means "wt %" unless otherwise specified.

EXAMPLE 1

(a) Preparation of a Metal Ion-treating Agent having 1,4-dihydro-9,10-dihydroxyanthracene (hereinafter referred to as DDA) supported on active carbon Into a 3 l eggplant type flask, 1 l (487g) of granular active carbon (coal-base active carbon manufactured by Mitsubishi Chemical Corporation) was taken, and nitrogen-substitution treatment was repeated under reduced pressure, so that oxygen in pores of active carbon was replaced by nitrogen. Then, in a nitrogen atmosphere, 1950 g of an aqueous solution containing 16 wt % of a disodium salt of DDA (the disodium salt of DDA will hereinafter be referred to as "DDAN", and the concentration of this DDAN is represented by a concentration calculated as anthraquinone), was added and adsorbed for 2.5 hours under reduced pressure. This mixture was subjected to suction filtration in a nitrogen atmosphere, and the obtained filtration cake was treated with 1 l of a 10% sulfuric acid solution and then washed with 1 l of deionized water substituted with nitrogen. The obtained metal ion-treating agent having DDA supported on active carbon, was stored in deionized water.

(b) Measurement of the Amount of DDA Supported on the Metal ion-treating Agent 10 ml of the metal ion-treating agent obtained above was sampled and extracted with a solvent mixture of acetone/methanol (1/1) by means of a Soxhlet extractor and then extracted with a toluene solvent, so that DDA supported on active carbon was extracted. Then, these solvents were distilled off, and the weight of remaining DDA was measured. As a result, the supported amount was 0.73 mol per liter of active carbon.

(c) Supporting Nickel on the Metal Ion-treating agent

Nickel chloride was dissolved in deionized water, 25% aqueous ammonia was added thereto to prepare an aqueous solution containing 1000 ppm as nickel of tetraammine nickel. The metal ion-treating agent in the step (a) was sampled in a wet volume of 20 ml, and 100 ml of deionized water was added thereto. Then, 1 g of sodium hydrosulfite was added thereto. To this mixture, the above nickel ion aqueous solution was added in an amount of 40 ml, and 0.5 g of sodium hydrosulfite was further added. The mixture was thoroughly shaked, whereby it was observed that nickel metal precipitated by reduction on the surface of the metal ion-treating agent and was laminated in a white color. The reaction mixture was left to stand still for about one hour, whereupon the supernatant was measured by an ICP atomic emission spectroscopic analysis (hereinafter referred to as ICP-AES), whereby no nickel ion was detected in the liquid, and 2 g of nickel was supported per le in the wet volume of the metal ion-treating agent.

(d) Treatment of a Palladium Plating Waste Water 10 ml of the nickel-supported metal ion-treating agent prepared in step (c) was taken and packed into a glass column having a diameter of 11 mm and a length of 150 mm, and a palladium-nickel alloy plating waste water containing tetraammine palladium sulfate as the main component (the palladium complex ion concentration was 1243 ppm as palladium, and the nickel ion concentration was 700 ppm as nickel, and the pH was 7.9) was subjected to passing-through treatment in downward flow at a space velocity of 2 hr$^{-1}$. The palladium ion concentration in the treated solution was measured by ICP-AES, and the results are shown in Table 1.

As shown in Table 1, the recovery rate of palladium up to 800 ml treatment was at least 90%. The recovered amount of palladium at that time was 99 g per 1 l of the metal ion-treating agent.

COMPARATIVE EXAMPLE 1

The palladium-nickel alloy plating waste water in Example 1 was treated in the same manner as in Example 1 using the metal ion-treating agent having no metal supported, as prepared in Example 1(a), and the results are shown in Table 1.

As shown in Table 1, up to 300 ml treatment, the palladium complex ions were reduced and recovered from the waste water in the form of metal palladium at a not too bad recovery rate such that the palladium ion concentration was at most 100 ppm. However, the palladium complex ions gradually started to leak, and the removal rate of palladium decreased. At the time of 400 ml treatment, the recovered amount of palladium metal was 46 g per 1 l of the metal ion-treating agent.

TABLE 1

| Example No. | Content calculated as Pd | Supported metal | Amount of treated water (Total amount) ($\lambda$) | Concentration of Pd ions in the eluate (ppm) |
|---|---|---|---|---|
| Example 1 | 1243 ppm | Nickel | 0.1 | 0.1 |
| | | | 0.2 | 0.1 |
| | | | 0.8 | 0.1 |
| | | | 0.9 | 66 |
| Comparative Example 1 | 1243 ppm | Nil | 0.1 | 0.1 |
| | | | 0.2 | 95 |
| | | | 0.3 | 83 |
| | | | 0.4 | 169 |

EXAMPLE 2

(a) Supporting Copper on a Metal Ion-treating Agent 11.8 g of copper acetate monohydrate was added to 30 ml of deionized water, and 35 ml of concentrated aqueous ammonia was added thereto with stirring to obtain an aqueous copper tetraammine solution.

The metal ion-treating agent of Example 1(a) was taken in a wet volume of 300 ml, and 100 ml of deionized water was added thereto. Then, the above aqueous copper tetraammine solution was gradually added with stirring, whereby copper metal was precipitated by reduction on the surface of the metal ion-treating agent, and a color change to a reddish copper color was observed. After about one hour, the supernatant was measured by ICP-AES, whereby no copper ions were detected, and 12.5g of copper was supported per 1 l in the wet volume of the metal ion-treating agent.

A part of the copper-supported metal ion-treating agent was pulverized and analyzed by powder X-ray diffraction analysis, whereby a weak diffraction peak attributable to copper metal was confirmed, as shown in FIG. 1. In FIG. 1, reference numeral 1 indicates a diffraction pattern of copper powder, numeral 2 a diffraction pattern of the copper-supported metal ion-treating agent, and numeral 3 a diffraction pattern of the metal ion-treating agent having no copper supported thereon. Thus, it was confirmed that at least a part thereof was supported in the form of fine metal.

(b) Supporting Silver or Platinum to a Metal Ion-treating Agent

Silver nitrate was dissolved in deionized water to obtain an aqueous silver nitrate solution containing 1000 ppm of silver ions. The metal ion-treating agent of Example 1(a) was sampled in a wet volume of 20 ml, and 100 ml of deionized water was added thereto. Then, the above aqueous silver nitrate solution was added in an amount of 40 ml thereto, and the mixture was thoroughly shaked and left to stand for one hour to let silver precipitate by reduction over the entire surface of the metal ion-treating agent. The supernatant was measured by ICP-AES, whereby no silver ions were detected therein, and the amount of silver supported per 1 l in the wet volume of the metal ion-treating agent was 2 g.

In the same manner, platinum was permitted to precipitate by reduction on the metal ion-treating agent by means of an aqueous sodium chloroplatinate solution (containing 1000 ppm of platinum ions) to obtain a platinum-supported metal ion-treating agent.

(c) Supporting a Mixture of Copper and Palladium to a Metal Ion-treating Agent 20 ml of an aqueous copper sulfate solution containing 1000 ppm of copper ions and 5 ml of an aqueous palladium chloride solution (containing hydrochloric acid) containing 1000 ppm of palladium ions, were mixed to obtain a copper-palladium mixed solution. The metal ion-treating agent of Example 1(a) was taken in a wet volume of 10 ml, and 100 ml of deionized water was added thereto. Then, the above copper-palladium mixed solution was added thereto, and the mixture was thoroughly shaked and left to stand for one hour to let copper-palladium precipitate by reduction over the entire surface of the metal ion-treating agent. The supernatant was measured by ICP-AES, whereby no copper and palladium ions were detected therein, and the amount of metals supported per 1 l in a wet volume of the metal ion-treating agent was 2.5 g in total.

(d) Treatment of a Cyan Type Gold Plating Waste Water

A cyan type gold plating waste water containing dicyano aurate(I) complex ions as the main component (containing 3300 ppm as gold, and the pH was 6.8) was diluted ten times, and 4 g of paraformaldehyde per liter was added thereto. Then, the pH of the aqueous solution was adjusted to from 10.3 to 10.8 by means of an aqueous KOH solution and citric acid.

Using the metal-supported metal ion-treating agents prepared in the above steps (a), (b) and (c) and in Example 1(c), the above plating waste waters were treated in the same manner as in Example 1 at a space velocity of 3 hr$^{-1}$, and the results are shown in Table 2.

As shown in Table 2, although there were some differences depending upon the metal-supported metal ion-treating agents, for example, with the copper-supported metal ion-treating agent, the recovery rate of gold was at least 90% until 7 l of the cyan type gold plating waste water was treated. The recovery rate of the gold at that time, was at least 232 g of per 1 l of the metal ion-treating agent.

TABLE 2

| Example No. | Content calculated as gold | Supported metal | Amount of treated water (Total amount) (λ) | Concentration of gold ions in the eluate (ppm) |
| --- | --- | --- | --- | --- |
| Example 2 | 330 ppm | Silver | 0.5 | 0.3 |
| | | | 1.0 | 0.9 |
| | | | 3.0 | 19.2 |
| | | | 5.0 | 120.0 |
| | 330 ppm | Copper | 0.5 | 0.1 |
| | | | 1.0 | 0.1 |
| | | | 5.0 | 0.1 |
| | | | 6.0 | 0.6 |
| | | | 7.0 | 9.2 |
| | | | 8.0 | 35.0 |
| | 330 ppm | Platinum | 0.5 | 0.2 |
| | | | 1.0 | 0.4 |
| | | | 3.0 | 12.8 |
| | | | 5.0 | 130.2 |
| | 330 ppm | Nickel | 0.5 | 0.1 |
| | | | 1.0 | 0.1 |
| | | | 4.0 | 0.1 |
| | | | 5.0 | 7.6 |
| | | | 6.0 | 93.2 |
| | 330 ppm | Copper-palladium | 0.5 | 0.1 |
| | | | 1.0 | 0.1 |
| | | | 5.0 | 2.0 |
| | | | 6.0 | 0.2 |
| | | | 8.0 | 20.7 |

EXAMPLE 3

(a) Supporting a Metal on Active Carbon 200g of granular active carbon was added to 500 ml of an aqueous palladium nitrate solution containing 800 ppm as palladium, and the mixture was stirred for one hour. Then, 0.5 g of hydrazine monohydrate was added thereto to let palladium precipitate by reduction on the active carbon, followed by washing with water to obtain palladium-supported active carbon.

On the other hand, in the case of copper-supported active carbon, 200 g of granular active carbon was added to 500 ml of an aqueous copper nitrate solution containing 800 ppm as copper and the mixture was stirred for one hour. Then, the pH was adjusted to 10 with an aqueous sodium hydroxide solution to let the hydroxide precipitate on the active carbon, followed by washing with water and drying. Further, the product was reduced in a hydrogen stream to obtain a copper-supported active carbon. In the same manner, a nickel-supported active carbon was prepared. The supported amount of each metal was determined by baking a sample, and then the metal was dissolved by an aqua regia, and measured by ICP-AES.

(b) Supporting DDA on Each Metal-supported Active Carbon 100 ml of each of the above metal-supported active carbons was sampled into a 300 ml eggplant type flask, and DDA was supported in the same manner as in Example 1 (a) using 200 g of an aqueous solution containing 16% of DDAN.

The supported amount of DDA per 1 l of each metal-supported active carbon was shown in Table 3.

TABLE 3

| Supported metal | Supported amount of DDA (mol) |
| --- | --- |
| 0.2% Ni | 0.79 |
| 0.2% Cu | 0.79 |
| 0.2% Pd | 0.76 |

(c) Treatment of a Cyan Type Gold Plating Waste Water

Using the metal ion-treating agents prepared by using active carbons having various metals supported thereon, the same cyan type gold plating waste water as used in Example 2(d) was treated in the same manner with an addition of paraformaldehyde, and the results are shown in Table 4.

As shown in Table 4, although there were some differences depending upon the supported metals, for example, with a metal ion-treating agent having 0.2% nickel supported thereon, the recovery rate of gold was at least 90% until sl of the-cyan type gold plating waste water was treated, and the recovered amount of gold at that time was at least 160 g per le of the metal ion-treating agent.

TABLE 4

| Example No. | Content calculated as gold | Supported metal | Amount of treated water (Total amount) (λ) | Concentration of gold ions in the eluate (ppm) |
| --- | --- | --- | --- | --- |
| Example 3 | 330 ppm | Copper | 0.5 | 0.2 |
| | | | 1.0 | 0.1 |
| | | | 4.0 | 0.1 |
| | | | 5.0 | 0.1 |
| | | | 6.0 | 30.2 |
| | 330 ppm | Nickel | 0.5 | 0.1 |
| | | | 1.0 | 0.2 |
| | | | 4.0 | 0.4 |
| | | | 5.0 | 8.0 |
| | | | 6.0 | 40.8 |
| | 330 ppm | Palladium | 0.5 | 0.1 |
| | | | 1.0 | 0.1 |
| | | | 3.0 | 0.1 |
| | | | 4.0 | 50.2 |
| | | | 5.0 | 280.5 |

COMPARATIVE EXAMPLE 2

Using the metal ion-treating agent prepared in Example 1(a), the waste water of Example 2(d) was treated in the same manner as in Example 2 with an addition of paraformaldehyde, and the gold ion concentration in the treated water is shown in Table 5.

At the time when 0.5 l of the cyan type gold plating waste water was treated, the gold ion concentration in the eluate exceeded 150 ppm, and the recovered amount of gold was 20 g per litter of the metal ion-treating agent. Thus, recovery of gold was inadequate.

TABLE 5

| Example No. | Content calculated as gold | Supported metal | Amount of treated water (Total amount) (λ) | Concentration of gold ions in the eluate (ppm) |
|---|---|---|---|---|
| Comparative Example 2 | 330 ppm | Nil | 0.5 | 154 |
| | | | 1.0 | 280 |
| | | | 1.5 | 295 |

EXAMPLE 4

(a) Cyan Type Gold Plating Waste Water

To 1 l of a cyan type gold plating waste water containing dicyano aurate(I) complex ions as the main component (containing 330 ppm as gold, and the pH was 7.0), a solution having nickel nitrate dissolved in aqueous ammonia (0.5 g of nickel nitrate hexahydrate was dissolved in 10 ml of 25% aqueous ammonia) was added. The pH of the cyan type gold plating waste water became 10.8.

The concentration of nickel ions in the cyan type gold plating waste water was 1.7 mM (100 ppm as nickel ions), which was in an excess of about 2 equivalents on an assumption that the nickel ions and cyanide ions liberated by reduction of dicyano aurate(I) complex ions in the waste water, would form tetracyano niccolate(II) complex ions.

(b) Treatment of the Cyan Type Gold Plating Waste Water

Using 10 ml of the copper-supported metal ion-treating agent prepared in Example 2, the cyan type gold plating waste water prepared in the above step (a) was treated at a space velocity of 10 hr$^{-1}$ in the same manner as in Example 2, and the concentration of gold ions during the treatment is shown in Table 6. Until 7l of the cyan type gold plating waste water was treated, the recovery rate of gold was at least 90%, and the recovered amount of gold was 231 g per 1 l of the metal ion-treating agent.

TABLE 6

| Example No. | Content calculated as gold | Supported metal | Amount of treated water (Total amount) (λ) | Concentration of gold ions in the eluate (ppm) |
|---|---|---|---|---|
| Example 4 | 330 ppm | Copper | 0.5 | 0.1 |
| | | | 1.0 | 0.1 |
| | | | 5.0 | 0.1 |
| | | | 6.0 | 0.1 |
| | | | 7.0 | 3.2 |
| | | | 8.0 | 20.1 |

EXAMPLE 5

(a) Cyan Type Gold Plating Waste Water

A cyan type gold plating waste water containing dicyano aurate(I) complex ions as the main component (containing 500 ppm as gold, and the pH was 7.0) was adjusted to pH 4 with citric acid.

(b) Treatment of the Cyan Type Gold Plating Waste Water

Using 10 ml of the copper-supported metal ion-treating agent prepared in Example 2, the cyan type gold plating waste water prepared in the above step (a) was treated at a space velocity of 3 hr$^{-1}$ in the same manner as in Example 2, and the concentration of gold ions during the treatment is shown in Table 7. Until 3.0 l of the cyan type gold plating waste water was treated, the recovery rate of gold was at least 90%, and the recovered amount of gold was 175 g per le of the metal ion-treating agent.

TABLE 7

| Example No. | Content calculated as gold | Supported metal | Amount of treated water (Total amount) (λ) | Concentration of gold ions in the eluate (ppm) |
|---|---|---|---|---|
| Example 5 | 500 ppm | Copper | 0.5 | 0.1 |
| | | | 1.0 | 1.8 |
| | | | 2.5 | 23.6 |
| | | | 3.0 | 38.2 |
| | | | 3.5 | 75.1 |

As described the foregoing, when noble metal complex ions in an aqueous solution are captured and recovered in the form of metal by means of a metal ion-treating agent having an anthrahydroquinone compound supported on a carbonaceous carrier, by preliminarily having a metal supported on the metal ion-treating agent, it is possible to carry out the reduction reaction of noble metal complex ions by the metal ion-treating agent and thereby to reduce and capture the noble metal efficiently.

Further, by permitting a compound having a reactivity with cyanide ions such as an aldehyde or a metal compound to be present, it is possible to carry out the reduction reaction of gold cyano complex ions smoothly and thereby to reduce and capture the gold effectively. It is particularly effective to recover gold from a gold plating waste water containing dicyano aurate(I) complex ions.

What is claimed is:

1. A method for reducing gold complex ions, comprising:
   preparing an agent consisting of an anthrahydroquinone compound and a metal selected from the group consisting of palladium, platinum, rhodium, copper, and silver supported on a carbonaceous carrier, then contacting said agent with gold complex ions in an aqueous solution, and recovering gold metal.

2. The method of claim 1, which further comprises contacting said gold complex ions in aqueous solution with an aldehyde and recovering gold metal.

3. The method according to claim 2, wherein the aldehyde is a substantially water-soluble lower aliphatic aldehyde.

4. The method according to claim 3, wherein the water-soluble lower aliphatic aldehyde is formaldehyde, paraformaldehyde, acetoaldehyde, propionaldehyde or glyoxal.

5. The method of claim 1 which further comprises contacting gold complex ions in an aqueous solution in the presence of a metal compound capable of reacting with cyanide ions to form a cyano complex, and recovering gold metal.

6. The method according to claim 5, wherein the metal compound capable of reacting with cyanide ions to form a cyano complex, is a water-soluble salt of nickel, zinc or cobalt.

7. A method according to claim 5, wherein the gold complex ions are dicyano aurate (I) complex ions or tetracyano aurate (III) complex ions.

8. A method for reducing palladium complex ions, comprising:
   preparing an agent consisting of an anthrahydroquinone compound and a metal selected from the group consisting of iron, cobalt, nickel, platinum, and rhodium supported on a carbonaceous carrier, then contacting said agent with palladium complex ions in an aqueous solution and recovering palladium metal.

9. The method according to claim 8, wherein the palladium complex ions are tetraamine palladium complex ions.

10. The method of claim 8, further comprising contacting said palladium complex ion with an aldehyde.

11. The method of claim 10, wherein the aldehyde is a substantially water-soluble lower aliphatic aldehyde.

12. The method of claim 10, wherein the aldehyde is formaldehyde, paraformaldehyde, acetoaldehyde, propionaldehyde or glyoxal.

13. A. The method of claim 8, further comprising contacting palladium complex ions in aqueous solution with a metal compound capable of reacting with cyanide ions to form a cyano complex, and recovering palladium metal.

14. The method of claim 13, wherein the metal compound capable of reacting with cyanide ions to form a cyano complex, is a water-soluble salt of nickel, zinc or cobalt.

* * * * *